US011997327B2

(12) United States Patent
Chen

(10) Patent No.: US 11,997,327 B2
(45) Date of Patent: May 28, 2024

(54) SYSTEM FOR PLAYING SPECIFIC STREAMING SELECTED FROM COMBINED STREAMINGS AND METHOD THEREFORE

(71) Applicant: LIGHT MTRIX INC., New Taipei (TW)

(72) Inventor: Wei-Ting Chen, Taipei (TW)

(73) Assignee: Light Matrix Inc., Taipei (TW)

( * ) Notice: Subject to any disclaimer, the term of this patent is extended or adjusted under 35 U.S.C. 154(b) by 0 days.

(21) Appl. No.: 17/565,383

(22) Filed: Dec. 29, 2021

(65) Prior Publication Data

US 2022/0210486 A1 Jun. 30, 2022

(30) Foreign Application Priority Data

Dec. 30, 2020 (CN) .......................... 202011620239.0

(51) Int. Cl.
*H04N 21/2365* (2011.01)
*H04N 19/172* (2014.01)
*H04N 19/174* (2014.01)
*H04N 21/845* (2011.01)

(52) U.S. Cl.
CPC ....... *H04N 21/2365* (2013.01); *H04N 19/172* (2014.11); *H04N 19/174* (2014.11); *H04N 21/8455* (2013.01)

(58) Field of Classification Search
CPC ............. H04N 21/2365; H04N 19/172; H04N 19/174; H04N 21/8455; H04N 21/2187; H04N 21/21805
See application file for complete search history.

(56) References Cited

U.S. PATENT DOCUMENTS

| | | | |
|---|---|---|---|
| 2004/0130501 A1* | 7/2004 | Kondo | H04N 5/2627 345/1.1 |
| 2012/0212579 A1* | 8/2012 | Frojdh | H04N 13/161 348/43 |
| 2015/0016514 A1* | 1/2015 | Wang | H04N 19/513 375/240.26 |
| 2017/0064374 A1* | 3/2017 | Eim | G06F 3/0485 |
| 2018/0089841 A1* | 3/2018 | Dai | G01P 3/38 |
| 2018/0103196 A1* | 4/2018 | Lee | H04N 23/90 |
| 2018/0324410 A1* | 11/2018 | Roine | H04N 23/698 |
| 2020/0118342 A1* | 4/2020 | Varshney | G06T 13/20 |
| 2022/0210486 A1* | 6/2022 | Chen | H04N 19/174 |

* cited by examiner

*Primary Examiner* — Richard T Torrente

(57) ABSTRACT

A system for playing specific streaming selected from combined streamings and a method thereof are disclosed. In the system, an array server combines video streamings outputted from signal sources, to form a multi-source streaming including all video streamings, and transmits the combined multi-source streaming to a streaming server, the streaming server provides the multi-source streaming to a client end, the client end obtains the video streaming to be played from the received multi-source streaming. Therefore, a user can immediately switch the video streamings with different view angles while watching live broadcast, so as to achieve the technical effect of reducing the streaming load of the server during live broadcast.

16 Claims, 7 Drawing Sheets

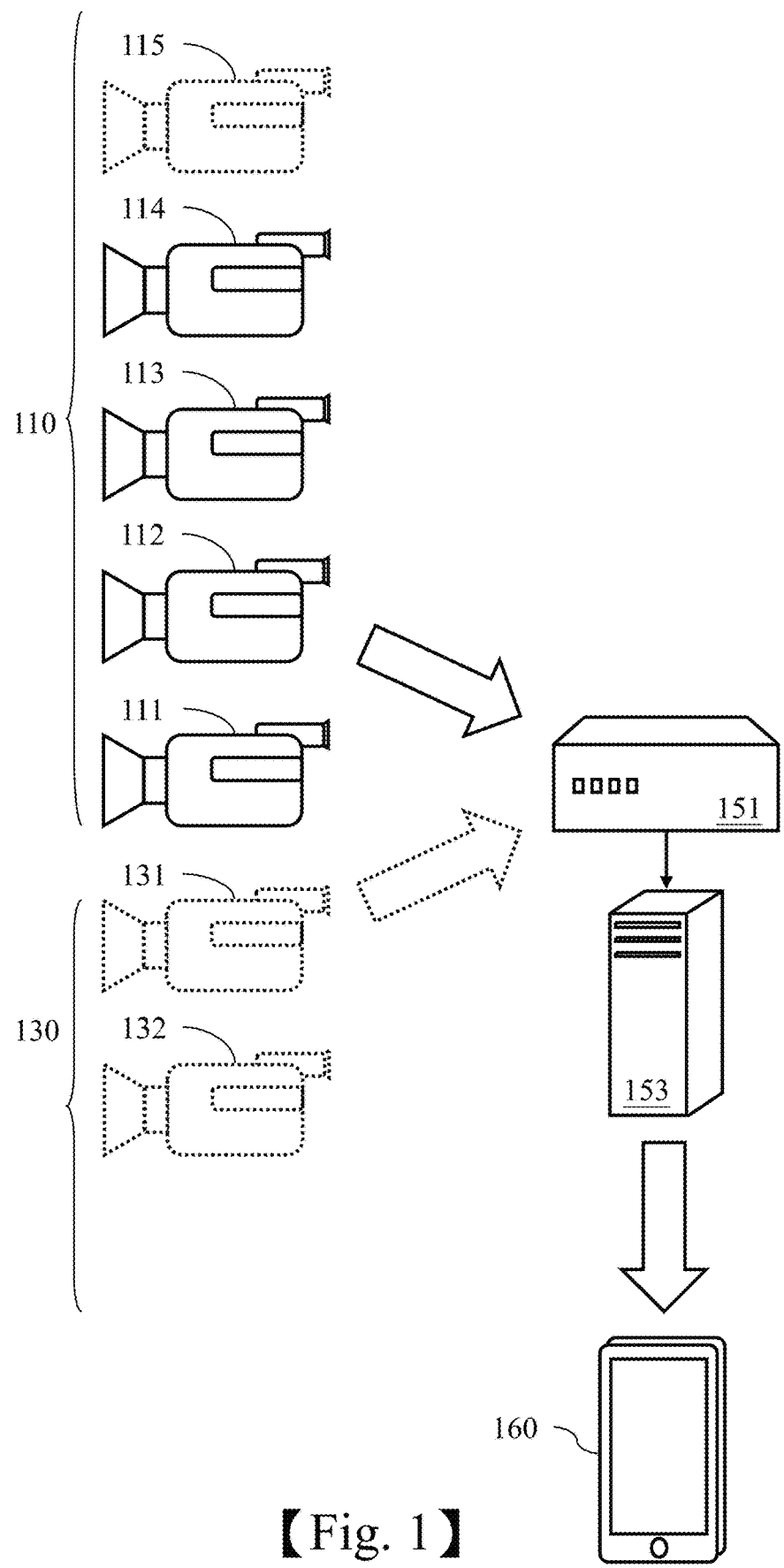
【Fig. 1】

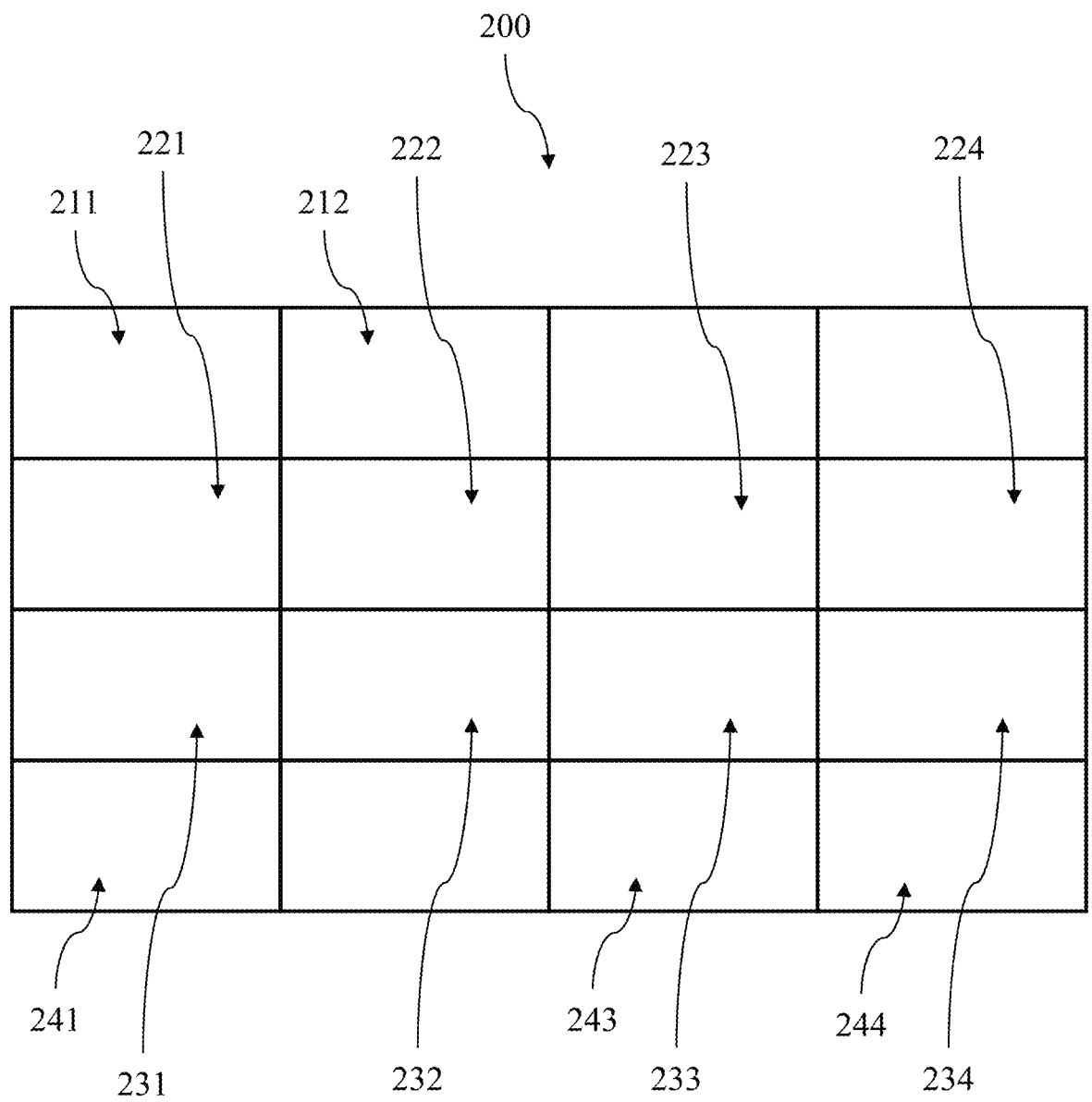
[Fig. 2]

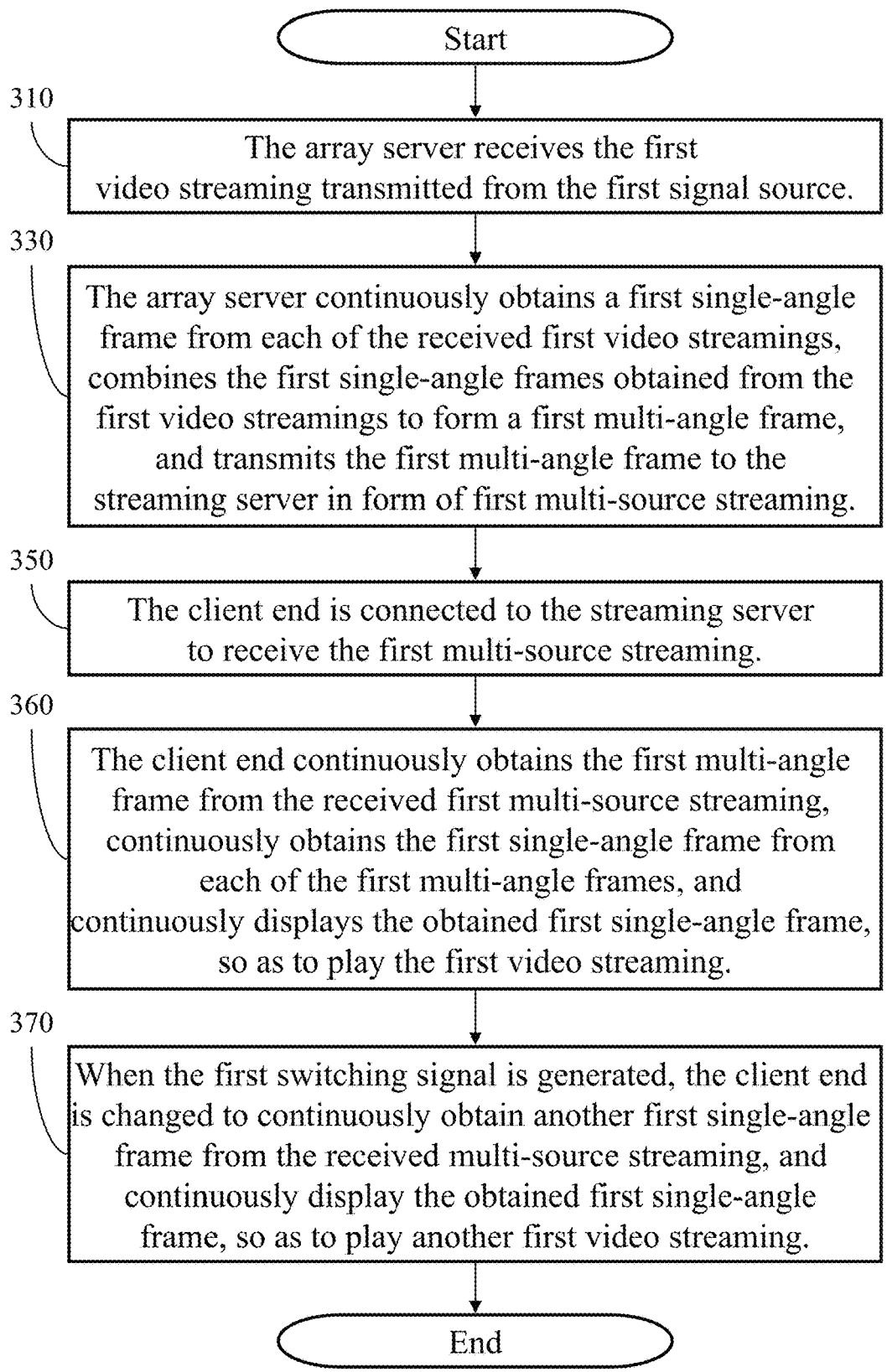
【Fig. 3】

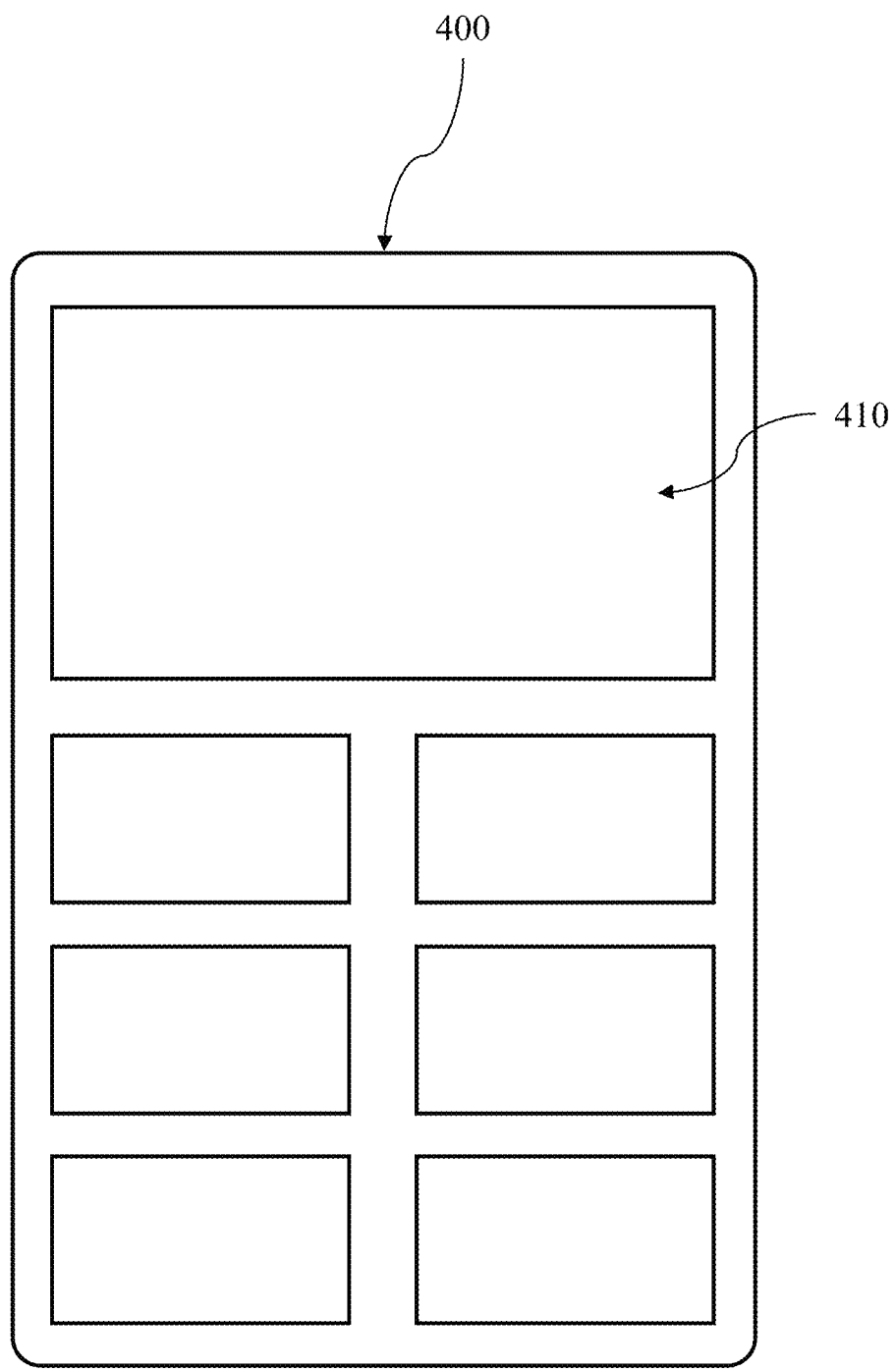
【Fig. 4】

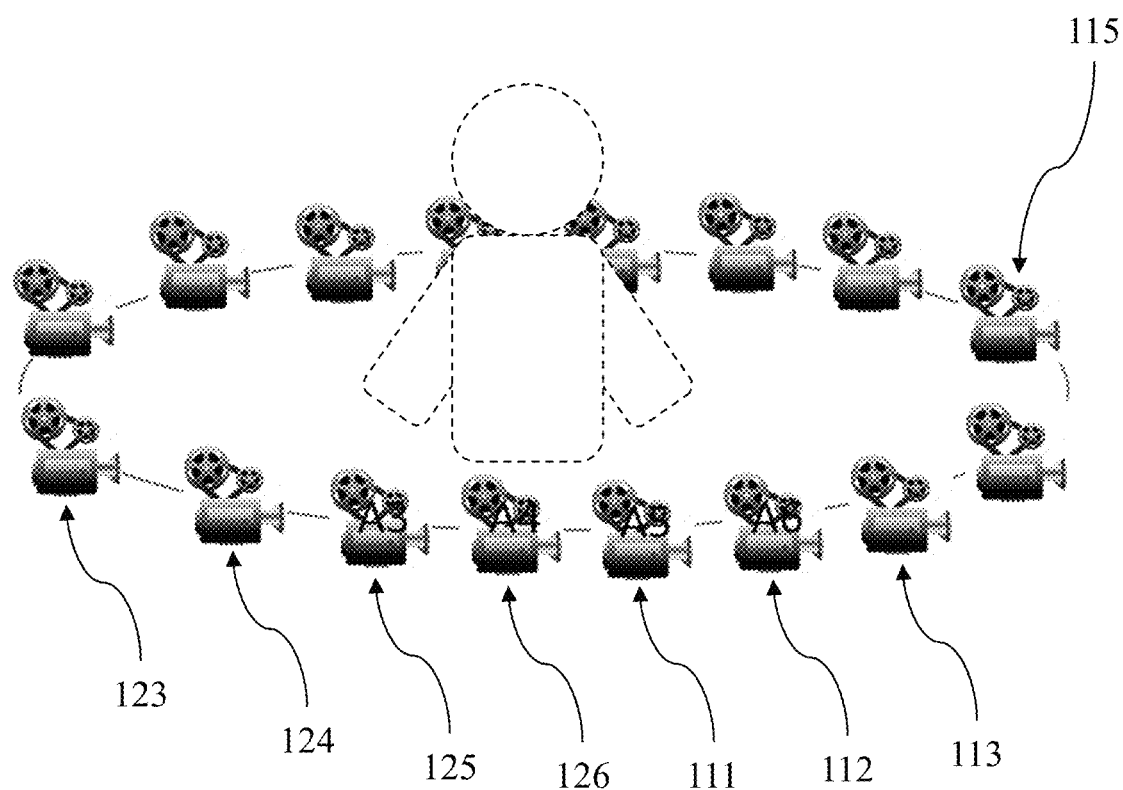
[Fig. 5]

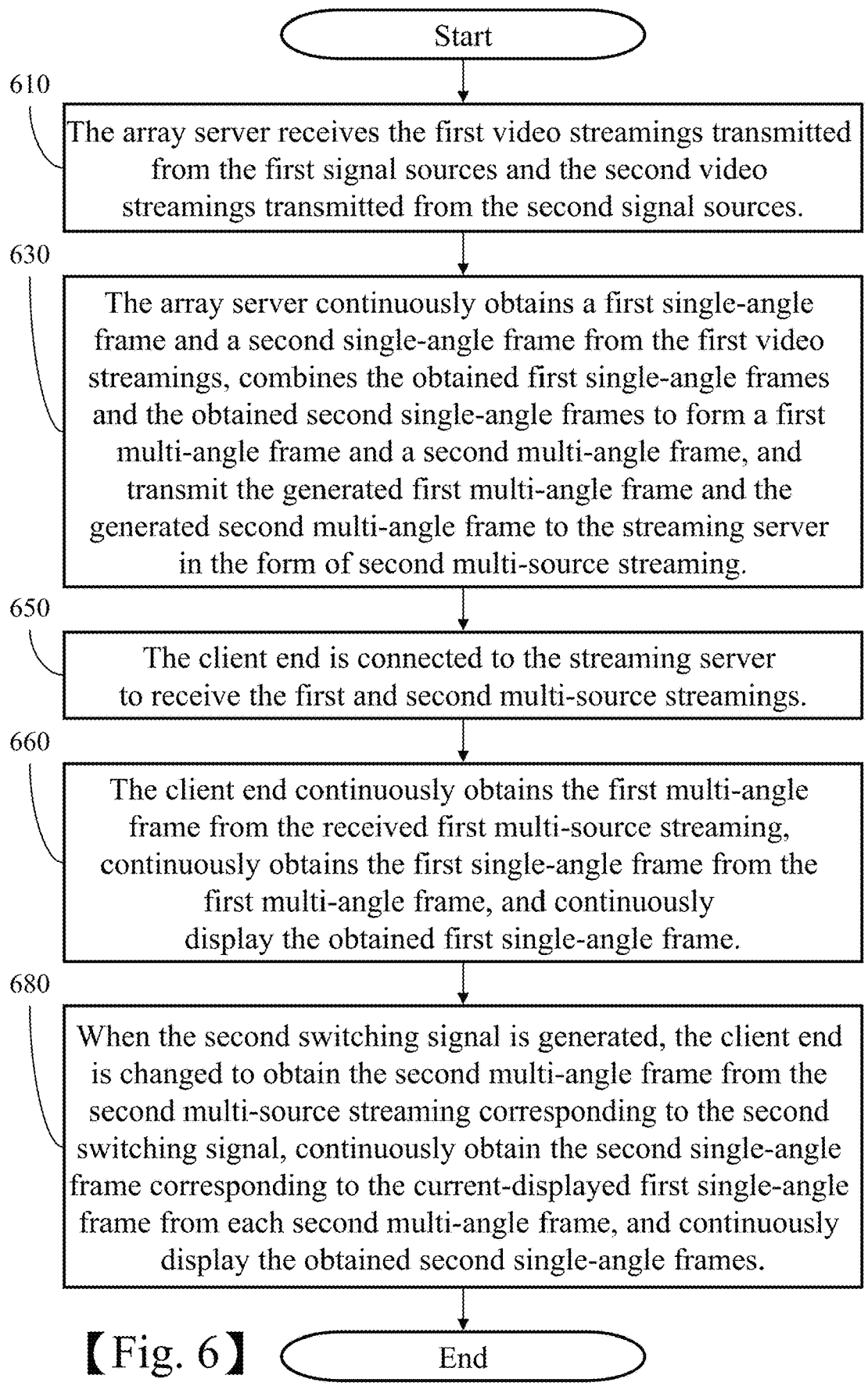
[Fig. 6]

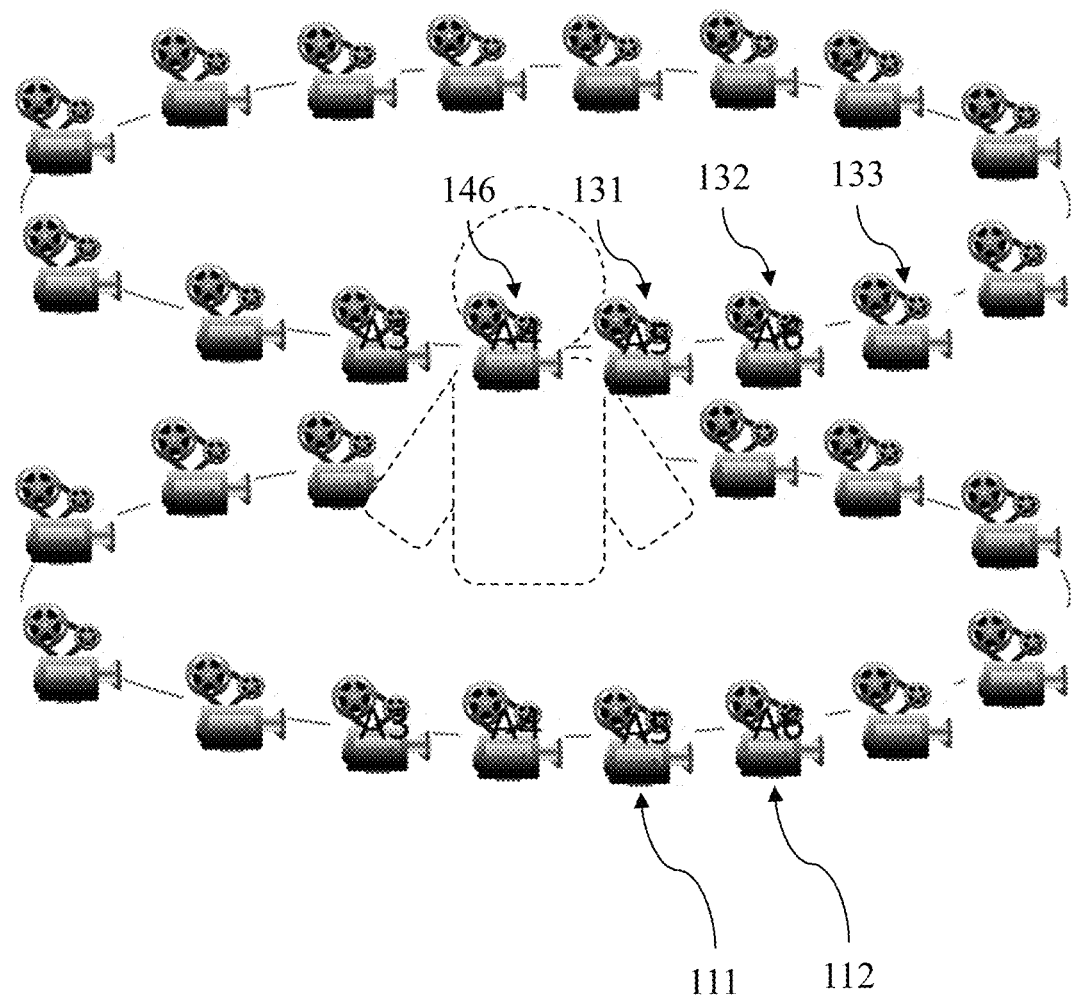
【Fig. 7】

SYSTEM FOR PLAYING SPECIFIC STREAMING SELECTED FROM COMBINED STREAMINGS AND METHOD THEREFORE

CROSS-REFERENCE TO RELATED APPLICATIONS

The present application is based on, and claims priority from, China Patent Application Serial Number 202011620239.0, filed 2020 Dec. 30, the disclosure of which is hereby incorporated by reference herein in its entirety.

BACKGROUND

1. Technical Field

The present invention is related to a streaming system and a method thereof, and more particularly to a system and a method for playing specific streaming selected from combined streamings.

2. Description of Related Art

The streaming is a technology of compressing multimedia files containing a series of frames and segmenting the compressed multimedia files to transmit through network, so as to provide real-time contents for viewing the multimedia files. This technology enables the packets of the packaged multimedia file to be transmitted from a server to a receiver like a stream, and the receiver can play the downloaded multimedia file and download the contents at the same time; that is, the receiver does not need to download the complete multimedia file in advance before playing the multimedia file.

Currently, one of the applications using the above-mentioned streaming is live webcast. The live broadcaster or the live broadcast unit can send video and audio signals to a streaming server, and a client end can receive the video steaming (streaming media) that contains the video and audio signals sent by the streaming server, so as to play the live broadcast content of the live broadcaster or the live broadcast unit. If the live broadcast unit provides live images from different view angles, the live broadcast unit can transmit multiple video signals to a streaming server, and the streaming server can transmit the video streaming under the viewing angle which is requested, to the client end.

In fact, transmitting a video streaming to a large number of different client ends may make the streaming server close to an upper limit of the load, so the streaming server usually does not provide video streamings with different view angles to the same client end at the same time; therefore, when the user at the client end needs to switch the view angle, the user can send a view-angle switching request to the streaming server, and the streaming server then transmits the video and audio streaming corresponding to the changed view angle to the client end, in response to the received view angle switching request. However, when the load of the streaming server is close to the upper limit, the streaming server may not be able to receive or process the view-angle switching request from the client end in real time, and it results in the delay in transmitting the video streaming under the changed (requested) view angle to the client end; in addition, even if the client end can receive the video streaming under the changed view angle, the client end does not start to play the video streaming under the changed view angle until the number of frames (that is, the time at which the video can be played) of the received video streaming reaches a preset value, and it causes that the video stops playing on the client end and the user at the client end is unable to watch the live broadcast for a period of time.

According to above-mentioned contents, what is needed is to develop an improved technical solution to solve the conventional technology problem that a user needs to wait a reaction time for switching the view angle when watching live broadcast.

SUMMARY

An objective of the present invention is to provide a system for playing specific streaming selected from combined streamings and a method thereof, to solve the conventional technology problem that a user needs to wait a reaction time for switching view angle requires when watching live broadcast.

In order to achieve the objective, the present invention provides a system for playing specific streaming selected from combined streamings, and the system includes first signal sources, a streaming server, an array server and a client end. Each of the first signal sources is configured to output a first video streaming. The array server is configured to receive the first video streaming, and generate a first multi-source streaming comprising first multi-angle frames, transmit the first multi-source streaming to the streaming server, wherein the array server obtains a first single-angle frame from each of the first video streamings and combines the first single-angle frames to form a first multi-angle frame. The client end is connected to the streaming server, and configured to receive the first multi-source streaming, and continuously obtain the first single-angle frame generated by the same one of the first signal source from the first multi-angle frames, and display the obtained first single-angle frames, so as to play the first video streaming corresponding to the obtained first single-angle frame, wherein when a first switching signal is generated, the array server is changed to continuously obtain another first single-angle frames generated by another, corresponding to the first switching signal, of the first signal sources, from the first multi-angle frame, and display the obtained another first single-angle frames, so as to play another first video streaming.

In order to achieve the objective, the present invention provides a method for playing specific streaming selected from combined streamings, and the method includes steps of: receiving, by an array server, first video streamings outputted by first signal sources; generating a first multi-source streaming comprising first multi-angle frames, and transmitting the first multi-source streaming to a streaming server, by the array server, wherein the array server obtains a first single-angle frame from each of the first video streamings and combines the first single-angle frames to form the first multi-angle frame; connecting a client end to the streaming server to receive the first multi-source streaming; continuously obtaining the first single-angle frames generated by the same one of the first signal sources from the first multi-angle frames, and displaying the obtained first single-angle frames to play the first video streaming, by the client end; and when a first switching signal is generated, changing to continuously obtain the first single-angle frame generated by another, corresponding to the first switching signal, of the first signal sources, from the first multi-angle frames, and displaying the obtained another first single-angle frames to play the another first video streaming, by the client end.

According to the above-mentioned system and method of the present invention, the difference between the present invention and the conventional technology is that, in the present invention, the array server combines the video streamings outputted from the signal sources, to form the multi-source streaming including all video streamings, and transmits the combined multi-source streaming to the streaming server, the streaming server provides the multi-source streaming to the client end, the client end obtains the video streaming to be played from the received multi-source streaming. Therefore, the solution of the present invention is able to solve the conventional technology problem, thereby achieving the technical effect of reducing the streaming load of the server during live broadcast.

BRIEF DESCRIPTION OF THE DRAWINGS

The structure, operating principle and effects of the present invention will be described in detail by way of various embodiments which are illustrated in the accompanying drawings.

FIG. 1 is a framework diagram of a system for playing specific streaming selected from combined streamings, according to the present invention.

FIG. 2 is a schematic view of M*N blocks, according to an embodiment of the present invention.

FIG. 3 is a flowchart of a method for playing specific streaming selected from combined streamings, according to the present invention.

FIG. 4 is a schematic view of an operation interface of an embodiment of the present invention.

FIG. 5 is a schematic view of arrangement of signal sources, according to an embodiment of the present invention.

FIG. 6 is a flowchart of method for playing specific streaming selected from combined streamings, according to the present invention.

FIG. 7 is a schematic view of another arrangement of signal sources, according to an embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

In the present invention, an array server combines video streamings outputted from signal sources to form a multi-source streaming with a higher resolution and having all video streamings, and the array server transmits the multi-source streaming to a conventional streaming server under the existing streaming service architecture, so that the client end can receive the multi-source streaming from the streaming server and obtain and play the video streaming outputted by the specific signal source from the multi-source streaming, and the client end also can obtain and play another video streaming from the multi-source streaming in response to a user's operation. Therefore, the user can quickly switch between video streamings with different view angles for continuously watching. In an embodiment, the array server, the streaming server and the client end can be computing apparatuses.

The computing apparatus mentioned in the present invention includes, but not limited to, one or more processing modules, one or more memory modules, and a bus connected to hardware components (including memory modules and processing modules). Through the above-mentioned hardware components, the computing apparatus can load and execute the operating system, so that the operating system can be executed on the computing apparatus, and can also execute software or programs. In addition, the computing apparatus also includes a housing, and the above-mentioned hardware components are arranged in the housing.

The bus of the computing apparatus mentioned in the present invention may be implemented by one or more types of bus; for example, the bus can include a data bus, an address bus, a control bus, an expansion bus or a local bus. The bus of computing apparatus can include, but not limited to, Industry Standard Architecture (ISA) bus, Peripheral Component Interconnect (PCI) bus, Video Electronics Standards Association (VESA) local bus, Universal Serial Bus (USB), PCI Express (PCI-E/PCIe) bus, . . . , etc.

The processing module of the computing apparatus is coupled with the bus. The processing module includes a register group or a register space. The register group or the register space can be completely set on the processing chip of the processing module, or can be all or partially set outside the processing chip and is coupled to the processing chip through dedicated electrical connection and/or a bus. The processing module can be a central processing unit, a microprocessor, or any suitable processing component. If the computing apparatus is a multi-processor apparatus, that is, the computing apparatus includes processing modules, and the processing modules can be all the same or similar, and coupled and communicated with each other through a bus. The processing module can interpret a computer instruction or a series of multiple computer instructions to perform specific operations or operations, such as mathematical operations, logical operations, data comparison, data copy/moving, so as to drive other hardware component, execute the operating system, or execute various programs and/or module in the computing apparatus.

The computing apparatus usually also includes one or more chipsets. The processing module of the computing apparatus can be coupled to the chipset, or electrically connected to the chipset through the bus. The chipset includes one or more integrated circuits (IC) including a memory controller and a peripheral input/output (I/O) controllers, that is, the memory controller and the peripheral input/output controller can be implemented by one integrated circuit, or implemented by two or more integrated circuits. Chipsets usually provide I/O and memory management functions, and multiple general-purpose and/or dedicated-purpose registers, timers. The above-mentioned general-purpose and/or dedicated-purpose registers and timers can be coupled to or electrically connected to one or more processing modules to the chipset for being accessed or used.

The processing module of the computing apparatus can also access the data stored in the memory module and mass storage area installed on the computing apparatus through the memory controller. The above-mentioned memory modules include any type of volatile memory and/or non-volatile memory (NVRAM), such as Static Random Access Memory (SRAM), Dynamic Random Access Memory (DRAM), Read-Only Memory (ROM), or Flash memory. The above-mentioned mass storage area can include any type of storage device or storage medium, such as hard disk drives, optical discs, flash drives, memory cards, and solid state disks (SSD), or any other storage device. In other words, the memory controller can access data stored in static random access memory, dynamic random access memory, flash memory, hard disk drives, and solid state drives.

The processing module of the computing apparatus can also connect and communicate with peripheral devices and interfaces including peripheral output devices, peripheral input devices, communication interfaces, or GPS receivers through the peripheral I/O controller and the peripheral I/O bus. The peripheral input device can be any type of input device, such as a keyboard, mouse, trackball, touchpad, or joystick. The peripheral output device can be any type of output device, such as a display, or a printer; the peripheral input device and the peripheral output device can also be the same device such as a touch screen. The communication interface can include a wireless communication interface and/or a wired communication interface. The wireless communication interface can include the interface capable of supporting wireless local area networks (such as Wi-Fi, Zigbee, etc.), Bluetooth, infrared, and near-field communication (NFC), 3G/4G/5G and other mobile communication network (cellular network) or other wireless data transmission protocol; the wired communication interface can be an Ethernet device, a DSL modem, a cable modem, an asynchronous transfer mode (ATM) devices, or optical fiber communication interfaces and/or components. The processing module can periodically poll various peripheral devices and interfaces, so that the computing apparatus can input and output data through various peripheral devices and interfaces, and can also communicate with another computing apparatus having the above-mentioned hardware components.

The operations of the system of the present invention will be described in the following paragraphs with reference to FIG. 1, which is a framework diagram of the system for playing specific streaming selected from combined streamings, according to the present invention. As shown in FIG. 1, the system includes a first signal source 110, an array server 151, a streaming server 153, a client end 160 and a second signal source 130. In another embodiment, the second signal source 130 is optional. The first signal source 110, the second signal source 130 and the streaming server 153 are connected to the array server 151 through physically connection wires or wireless communication manner, and the streaming server 153 can be linked to the client end 160 through wireless network, but the present disclosure is not limited thereto.

The first signal source 110 outputs a first video streaming and the second signal source 130 outputs a second video streaming. In general, in the present invention, the video streamings (including the first video streaming and the second video streaming) outputted from the signal sources (including the first signal source 110 and the second signal source 130) are usually generated by the signal sources; for example, the signal source can continuously capture external images to generate continuous frames and output the generated frames as the video streaming in a generation order; however, the present disclosure is not limited to above-mentioned example.

In general, the signal source can be a computing apparatus (such as a camera) for capturing images and sounds and transforming the captured images and sounds into the video signals, but the present disclosure is not limited thereto; for example, the signal source can be a computing apparatus storing multimedia files and transmitting the stored multimedia files to the array server 151. The signal source can transmit the video signals or multimedia files to the array server 151 by manner of various conventional protocols, such as network device interface (NDI) protocol.

It should be noted that the system of the present invention can include at least two first signal sources 110, and also can include at least two second signal sources 130. In general, the amount of the second signal sources 130 can be the same as that of the first signal sources 110, and each first signal source 110 corresponds to different one of the second signal sources 130, that is, the first signal sources 110 and the second signal sources 130 are in one-to-one correspondence. However, the present disclosure is not limited thereto.

The array server 151 receives the first video streamings outputted by the first signal sources 110, and obtains a first single-angle frame from each of the received first video streamings, and combines the obtained first single-angle frames from the first video streamings to form a first multi-angle frame.

In detail, the array server 151 first generates the multi-angle frame 200 having M*N blocks, as shown in FIG. 2, the amount of the blocks in the multi-angle frame 200 is higher than or equal to the amount of the first signal sources 110. Each of M and N is greater than one; in most embodiments, M and N have the same values, such as the power of two, but the present disclosure is not limited thereto. For example, besides being two or four, the value of each of M and N can be three or five, and values of M and N can be different from each other.

The array server 151 defines the correspondence between the blocks of the multi-angle frame 200 and the obtained first single-angle frames based on source identification data of the first signal sources 110, and the array server 151 locates the obtained first single-angle frames into the blocks of the multi-angle frame 200, respectively, so as to generate the first multi-angle frame. The source identification data indicates the specific signal source and is usually in form of letters, numbers, symbols arranged in a specific manner; for example, the source identification data can be a network address of the signal source, the number assigned to an interface connected to the signal source, the product serial number of the signal source, or specific data preset in the signal source; however, the present disclosure is not limited to the above-mentioned examples.

For example, the array server 151 arranges the signal sources based on the source identification data of the signal sources (that is, the first signal sources 110), and defines the correspondence between the blocks of the multi-angle frame 200 and the first single-angle frames generated by the arranged signal sources in a sequence order from left to right and from top to bottom. For example, in an embodiment, there are four first signal sources (111~114), and the array server 151 defines 2*2 blocks which are arranges at a top left corner, a bottom left corner, a top right corner and a bottom corner, respectively, and the array server 151 arranges a sequence of the first signal sources based on source identification data of the first signal sources (111~114), such as a sequence of the first signal source 114, the first signal source 113, the first signal source 112, and the first signal source 111. The first single-angle frames generated by the first signal sources 114 can corresponded to the block at the upper left corner, the first single-angle frame generated by the first signal source 113 can corresponded to the block at top right corner, the first single-angle frame generated by the first signal source 112 can corresponded to the block at the bottom left corner, and the first single-angle frame generated by the first signal source 111 can corresponded to the block at the bottom right corner.

In an embodiment, when the resolution of the first single-angle frame is different from the resolution of the block of the multi-angle frame 200, the array server 151 can adjust (increase or decrease) the resolution of the first single-angle frame, so as to make the resolution of the first single-angle frame the same as the resolution of the block of the multi-angle frame 200.

In practice, the array server 151 continuously executes the operation of generating the first multi-angle frame, not just once, so that the array server 151 can generate a series of first multi-angle frames; that is, after generating a first multi-angle frame, the array server 151 continuously obtains another different first single-angle frame (which is usually another first single-angle frame located behind and adjacent to the previously-obtained first single-angle frame) from the first video streaming received from different one of the signal sources, and the array server 151 combines the another obtained first single-angle frames to form another first multi-angle frame, and the above-mentioned operations are repeated until the array server 151 does not receive any first video streaming transmitted from the signal sources.

The array server 151 generates a first multi-source streaming. The first multi-source streaming generated by the array server 151 includes the first multi-angle frame generated by the array server 151, and the first multi-angle frame of the first multi-source streaming are arranged in a generation order of the array server 151.

The array server 151 is also configured to transmit the generated first multi-source streaming to the streaming server 153. In general, the array server 151 transmits the first multi-source streaming to the streaming server 153 by manners with real-time message protocol (RTMP), but the present disclosure is not limited thereto. The manner of transmitting the video streaming can be used in transmission between the array server 151 and the streaming server 153. When the multi-angle frame is generated, the array server 151 transmits the generated multi-angle frame to the streaming server 153 in time.

During the process of generating the first multi-source streaming, the array server 151 can also combine the second video streamings outputted by the second signal sources 130 to form the second multi-source streaming, and transmit the generated second multi-source streaming to the streaming server 153. That is, the array server 151 can receive the second video streamings outputted by the second signal sources 130, continuously obtain a second single-angle frame from each of the second video streamings, and continuously combine the obtained second single-angle frames to form a second multi-angle frame, and generate the second multi-source streaming containing the generated second multi-angle frames in sequential order.

The streaming server 153 can receive the first multi-source streaming generated by the array server 151. When the array server 151 also generates the second multi-source streaming, the streaming server 153 can receive the second multi-source streaming generated by the array server 151.

The streaming server 153 can be connected to the client end 160 and configured to provide the first multi-source streaming to the client end 160 which requests the first multi-source streaming; in an embodiment, the streaming server 153 can provide the second multi-source streaming and the first multi-source streaming together to the client end 160 requesting the first multi-source streaming.

In an embodiment, the client end 160 can be a device (such as a mobile phone or a tablet computer) for the user to easy carry, but the present disclosure is not limited thereto.

DETAILED DESCRIPTION

The client end 160 is connected to the streaming server 153 and configured to request the streaming server 153 to provide the first multi-source streaming, and receive the first multi-source streaming provided by the streaming server 153. When the client end 160 receives the first multi-source streaming and the second multi-source streaming received from the streaming server 153 together. The client end 160 can receive the first multi-source streaming and the second multi-source streaming through the transport protocol of HTTP Live Streaming (HLS), but the present disclosure is not limited thereto, and any manner of transmitting video signal can be applied for transmission between the streaming server 153 and the client end 160.

The client end 160 is also configured to obtain the first multi-angle frame from the first multi-source streaming, and obtain a first single-angle frame from the obtained first multi-angle frame, and display the obtained first single-angle frame. In practice, the client end 160 continuously obtains the first single-angle frame at the same location (that is, the same block) from the first multi-angle frame of the first multi-source streaming according to the sequence of the first multi-angle frame included in the first multi-source streaming, and displays the obtained first single-angle frames in sequential order, so as to play the first video streaming including the obtained first single-angle frames. In the present invention, the client end 160 obtains the first single-angle frame at the corresponding location (block) based on a preset value; for example, the preset value can correspond to the block at a specific corner (such as the upper left corner or the top right corner, correspond to the block at the central location, or the block at the half location among all blocks (such as the block at the eighth location among 16 blocks; however, the present disclosure is not limited to the above-mentioned example.

In addition, when the client end 160 continuously obtains the first multi-angle frame from the first multi-source streaming and obtains the first single-angle frame from the first multi-angle frame to display, the first switching signal or the second switching signal or the pause control signal may be generated upon the user's specific operation at the client end 160. For example, the first switching signal or the second switching signal can be a touch control signal generated by the user at the client end 160 by sliding on a main display area 410 of a touch screen 400 of the client end 160 by a movement distance, as shown in FIG. 4, or can be a rotation signal generated by the user rotating the client end 160 in a movement direction or by an angle; however, the specific operation of generating the first switching signal or the second switching signal is not limited to above-mentioned example. The pause control signal can be a touch control signal generated by a user by single or double clicking the main display area 410, but the present invention is not limited to above-mentioned examples.

When the first switching signal is generated, the client end 160 obtains another first single-angle frame corresponding to the first switching signal, from the multi-angle frame obtained from the first multi-source streaming, and displays the obtained first single-angle frame, so as to play another first video streaming including the first single-angle frames corresponding to the first switching signal. The played first video streaming is also expressed as the first video streaming corresponding to the first switching signal in the present invention.

In an embodiment, when the first signal sources 110 are arranged in a certain sequential order, the client end 160 can obtain the first single-angle frame outputted by another first signal source 110, which is arranged apart from the first signal source 110 outputting the currently-displayed first single-angle frame by a certain interval from the first multi-angle frame, according to the direction corresponding to the movement direction indicated by the first switching signal.

For example, when the block corresponding to the currently-displayed first single-angle frame is the block 231 arranged in the ninth position (as shown in FIG. 2), and the arrangement sequence of the blocks of the first multi-angle frame is from left to right and from top to bottom; that is, for two adjacent blocks, the left-top block is arranged before the right-bottom block; when the first switching signal is a touch control signal of leftward sliding, the first switching signal corresponds to the block 224 arranged at the eighth location, the client end 160 is changed to continuously obtain the first single-angle frame of the block 224 from the first multi-angle frame; when the first switching signal is a touch control signal of rightward sliding, the first switching signal corresponds to the block 232 arranged at the tenth location, the client end 160 is changed to continuously obtain the first single-angle frame of the block 232 from the first multi-angle frame. Similarly, in a condition that the currently-displayed first single-angle frame corresponds to the block 224 arranged at the eighth location, when the first switching signal is a touch control signal of leftward sliding, the first switching signal corresponds to the block 223 arranged at the seventh location, the client end 160 is changed to continuously obtain the first single-angle frame of the block 223 from the first multi-angle frame; when the first switching signal is a touch control signal of rightward sliding, the first switching signal corresponds to the block 231 arranged at the ninth position, the client end 160 is changed to continuously obtain the first single-angle frame of the block 231 from the first multi-angle frame.

The block corresponding to the first switching signal can be related to the movement direction and the movement distance indicated by the first switching signal. In a condition that the block corresponding to the currently-displayed first single-angle frame is the block 231 arranged at the ninth position, and distance thresholds of different length values are set, when the first switching signal is a touch control signal of leftward sliding and the movement distance of the first switching signal does not match the first distance threshold, it indicates that the first switching signal corresponds to the block 224 arranged at the previous location (that is, the eighth location); when the movement distance of the first switching signal just matches the first distance threshold, it indicates that the first switching signal corresponds to the block 223 arranged at the previous-two location (that is, the seventh location); when the movement distance of the first switching signal matches the first distance threshold and the second distance threshold, it indicates that the first switching signal corresponds to the block 222 arranged at the previous-three location (that is, the sixth location), and so forth. Similarly, in a condition that the first switching signal is a touch control signal of rightward sliding, when the movement distance of the first switching signal does not match the first distance threshold, it indicates that the first switching signal corresponds to the block 232 arranged at the later location (that is, the tenth location); when the movement distance of the first switching signal matches the first distance threshold only, it indicates that the first switching signal corresponds to the block 233 arranged at the later-two location (that is, the eleventh location); when the movement distance of the first switching signal matches the first distance threshold and the second distance threshold, it indicates that the first switching signal corresponds to the block 234 arranges at the later-three location (that is, the twelfth location), and so forth.

When a pause control signal is generated, the client end 160 pauses obtaining the first multi-angle frame from the first multi-source streaming, also pauses obtaining the first single-angle frame from the first multi-angle frame or stops displaying the first single-angle frame obtained from the first multi-angle frame; for example, the client end 160 can continuously display the last first single-angle frame obtained before the pause control signal is generated, so as to cause playing the first video streaming. After the pause control signal is generated, before the play control signal is not generated, when the first switching control signal is generated, the client end 160 can obtain the another first single-angle frame corresponding to the first switching signal from the multi-angle frame including the currently-displayed first single-angle frame, and display the obtained first single-angle frame. By the manner similar to the above-mentioned manner, the client end 160 can select to obtain different first single-angle frame from the multi-angle frame including the currently-displayed first single-angle frame according to the movement direction or the movement direction and the movement distance indicated by the first switching control signal. After the pause control signal is generated, when the play control signal is generated, the client end 160 can select to continuously display the first multi-angle frame obtained from the currently-received first multi-source streaming based on a preset value, or select to start displaying the obtained first multi-angle frame from the first multi-source streaming received after the pause control signal is generated; however, the present invention is not limited to the above-mentioned examples.

After the first switching signal is generated, the client end 160 can set the preset value to correspond to the block corresponding to the generated first switching signal. As a result, when the client end 160 continuously obtains the first single-angle frame from the first multi-angle frame obtained from the first multi-source streaming, the client end 160 obtains the first single-angle frame from the block corresponding to the first switching signal, that is, the client end 160 continuously obtains the first single-angle frame from the block of the first multi-angle frame located at the same location.

When the second switching signal is generated, the client end 160 is changed to continuously obtain the second single-angle frame corresponding to the currently-displayed first single-angle frame from the second multi-angle frame obtained from the second multi-source streaming, and display the obtained second single-angle frame, so as to play the second video streaming including the second single-angle frame. In the present invention, the above-mentioned played second video streaming is also defined as the second video streaming corresponding to the second switching signal. In general, the second single-angle frame corresponding to the currently-displayed first single-angle frame is the second single-angle frame corresponding to the block of the second multi-angle frame with location the same as the location of the block corresponding to the currently-displayed first single-angle frame in the first multi-angle frame. The same locations refer to the same arrangement sequences. For example, when the block corresponding to the currently-displayed first single-angle frame is arranged at the ninth location in the first multi-angle frame, the block corresponding to the second single-angle frame corresponding to the currently-displayed first single-angle frame is also at the ninth position in the second multi-angle frame.

In an embodiment of the present invention, the system may include more than one second signal source 130; for example, when there are multiple second signal sources 130 in the system of the present invention, the movement distance indicated by the second switching signal can make the second switching signal correspond to different second signal source 130, for example, in a condition that there are two second signal sources 130 disposed above the plane where the first signal source 110 is disposed, the client end 160 can set a distance threshold, and when the movement distance indicated by the second switching signal does not exceed the distance threshold, it indicates that the second switching signal corresponds to one of the second signal sources 130 closer to the first signal source 110; when the movement distance indicated by the second switching signal exceeds the distance threshold, it indicates that the second switching signal corresponds to the other of the second signal source 130 more away from the first signal source 110.

The operations of the system and method of the present invention will be described with reference to a first embodiment. Please refer to FIG. 3, which is a flowchart of a method for playing specific streaming selected from combined streamings of the present invention. In the first embodiment, the first signal source 110 are cameras and the amount of the first signal sources 110 is sixteen, but the present disclosure is not limited thereto.

Before the streaming service of the present invention is provided, the first signal sources 110 must be set up first. In the first embodiment, in a condition that the signal sources (111~126) are mounted surround a performance stage, and the signal sources (111~126) are mounted on the same horizontal plane and arranged in a circular or arc-shaped track, as shown in FIG. 5. The network addresses of the signal sources (111~126) include 172.0.0.1~172.0.0.16, and the signal sources (111~126) are arranged in a network address sequence from small to large; for example, the first signal source 111 having the network address of 172.0.0.1 is adjacent to the first signal source 112 having the network address of 172.0.0.2 and the first signal source 126 having the network address of 172.0.0.16; the first signal source 112 having the network address of 172.0.0.2 is adjacent to the first signal source 111 having the network address of 172.0.0.1 and the first signal source 113 having the network address of 172.0.0.3; the first signal source 125 having the network address of 172.0.0.15 is adjacent to the first signal source 124 having the network address of 172.0.0.14 and the first signal source 126 having the network address of 172.0.0.16; the first signal source 126 having the network address of 172.0.0.16 is adjacent to the first signal source 125 having the network address of 172.0.0.15 and the first signal source 111 having the network address of 172.0.0.1.

After the first signal source 110 are set up completely, the first signal sources 110 start capturing images of the performance stage, and transmitting the captured images to the array server 151 in manner of video streaming or streaming media. In the first embodiment, in a condition that each of the resolutions of the first video streamings generated by the signal sources (111~126) is 960*540, and the signal sources (111~126) transmit the first video streamings to the array server 151 through NDI protocol.

After the array server 151 receives the first video streaming transmitted from the first signal source 110 (step 310), the array server 151 continuously obtains a first single-angle frame from each of the received first video streamings, combines the first single-angle frames obtained from the first video streamings to form a first multi-angle frame, and transmits the first multi-angle frame to the streaming server 153 in form of first multi-source streaming (step 330). In the first embodiment, the array server 151 generates the first multi-angle frame with the resolution of 3840*2160 and defines 4*4 blocks in the first multi-angle frame, and each block has a resolution of 960*540, as shown in FIG. 2; the array server 151 also defines a correspondence between the blocks of the first multi-angle frame and the first single-angle frames obtained from the first video streaming based on the network addresses (that is, the source identification data) of the signal sources (111~126). For example, the array server 151 can define 4*4 blocks in a sequential order from left to right and from top to bottom, the array server 151 can define that the first single-angle frame of the first video streaming generated by the camera (that is, the first signal source 111) having the network address of 172.0.0.1 corresponds to the block 211, the first single-angle frame of the first video streaming generated by the camera (that is, the first signal source 112) having network address of 172.0.0.2 corresponds to the block 212, the first single-angle frame of the first video streaming generated by the camera (that is, the first signal source 113) having the network address of 172.0.0.3 corresponds to the block 213, the first single-angle frame of the first video streaming generated by the camera (that is, the first signal source 115) having the network address of 172.0.0.5 corresponds to the block 221, the first single-angle frame of the first video streaming generated by the camera (that is, the first signal source 123) having the network address of 172.0.0.13 corresponds to the block 241, the first single-angle frame of the first video streaming generated by the camera (that is, the first signal source 125) having the network address of 172.0.0.15 corresponds to the block 243, the first single-angle frame of the first video streaming generated by the camera (that is, the first signal source 126) having the network address of 172.0.0.16 corresponds to the block 244. Next, the array server 151 arranges the first single-angle frames into the blocks (211~244), respectively. As a result, the array server 151 can generate a first multi-angle frame including sixteen first single-angle frames, so as to generate the first multi-source streaming including the first multi-angle frames and transmit the first multi-source streaming to the streaming server 153 by using a pull-stream manner with instant message protocol.

After the streaming server 153 receives the first multi-source streaming generated by the array server 151, the client end 160 can be connected to the streaming server 153 to request the streaming server 153 to provide the first multi-source streaming. After the streaming server 153 receives the request from the client end 160, the streaming server 153 transmits the first multi-source streaming to the client end 160, to enable the client end 160 to receive the first multi-source streaming (step 350). In the first embodiment, the client end 160 can receive the first multi-source streaming by pull-stream manner with HLS protocol.

After the client end 160 receives the first multi-source streaming, the client end 160 continuously obtains the first multi-angle frame from the received first multi-source streaming, continuously obtains the first single-angle frame from each of the first multi-angle frames, and continuously displays the obtained first single-angle frame, so as to play the first video streaming (step 360). In the first embodiment, in a condition that the preset value indicates that the single-angle frame to be obtained is located in the block arranged at the first location, the client end 160 starts calculation on the first multi-angle frame from the upper left corner; when the pixel on the upper left corner of the first multi-angle frame has a coordinate (1,1), the client end 160 obtains the image with the first to 960-th pixels on an X-axis and the first to 540-th pixels on an Y-axis in each first multi-angle frame, and uses the obtained image as the first single-angle frame, and displays the obtained image (that is, the first single-angle frame). As a result, the first video streaming generated by the first signal source 111 can be played on the client end 160. In an embodiment, the client end 160 uses the frames per second (FPS) of the first multi-source streaming as the operation frequency of obtaining the first multi-angle frame from the first multi-source streaming.

When the client end 160 plays the first video streaming, when the first switching signal is generated, the client end 160 is changed to continuously obtain another first single-angle frame from the received multi-source streaming, and continuously display the obtained first single-angle frame, so as to play another first video streaming (step 370). In the first embodiment, in a condition that the first switching signal is a touch control signal generated by a user's finger rightwardly sliding on a main display area 410 of a touch screen 400 of the client end 160 (as shown in FIG. 4), the touch control signal indicative of left and right sliding on the main display area 410 is used to change the view angle of the currently-played video streaming, so that after the first switching signal is generated, the client end 160 selects the first video streaming outputted from the first signal source 112 arranged adjacent to and after the first signal source 111 of the currently-played first video streaming (that is, the change is in counterclockwise direction) based on the touch control signal (the first switching signal) of rightwardly sliding; that is, the client end 160 starts calculation from the upper left corner of the first multi-source frame, and is changed to continuously obtain the image of 961-th to 1920-th pixels on the X-axis and the first to 540-th pixels on the Y axis from the first multi-source frame, use the obtained image as the first single-angle frame generated by the first signal source 112, and display the obtained first single-angle frame. As a result, the first video streaming generated by the first signal source 112 can be played on the main display area 410.

Similarly, when the client end 160 plays the second video streaming generated by the first signal source 112 and the touch control signal (the first switching signal) of rightwardly sliding is generated again, the client end 160 continuously obtains the first multi-angle frame from the received first multi-source streaming, continuously obtains the first single-angle frame, generated by another first signal source 113 corresponding to the first switching signal, from the obtained first multi-angle frame, that is, the client end 160 obtains the image of the 1921-th to 2880-th pixels on the X-axis and the first to 540-th pixels on the Y-axis from the first multi-angle frame and continuously display the obtained image, so as to play the first video streaming generated by shooting operation of the first signal source 113. When the first switching signal generated again is a touch control signal of leftwardly sliding, the client end 160 continuously obtains the first multi-angle frame from the received first multi-source streaming, continuously obtains the first single-angle frame generated by another first signal source 111 corresponding to the first switching signal, from the first multi-angle frame, that is, the client end 160 obtain the image of the first to 960-th pixels on the X-axis and the first to 540-th pixels on the Y-axis in each first multi-angle frame, and continuously display the obtained image, so as to play the first video streaming generated by shooting operation of the first signal source 111.

After the first switching signal is generated, the client end 160 selects and outputs the first video streaming outputted from another first signal source, which is located relative to the first signal source 111 of the currently-played first video streaming by the movement direction and the movement distance corresponding to the first switching signal. In a condition that the rightward movement direction indicates to select the first signal source 110 in the counterclockwise direction, the client end 160 selects the first single-angle frame arranged after the corresponding block, and when the movement distance is not greater than the first distance threshold, the client end 160 is changed to play the first video streaming outputted from the first signal source 112 on the main display area 410, that is, the client end 160 starts calculation from the upper left corner and is changed to continuously obtain the image of the 961-th to the 1920-th pixels on the X-axis and the first to 540-th pixels on the Y-axis from the first multi-angle frame, and use the obtained image as the first single-angle frame outputted from the first signal source 112, and display the obtained first single-angle frame on the main display area 410; when the movement distance is greater than the first distance threshold but not greater than the second distance threshold, the client end 160 is changed to play the first video streaming outputted by the first signal source 113 on the main display area 410, that is, the client end 160 is changed to continuously obtain the image of the 961-th to 1920-th pixels on the X-axis and the first to 540-th pixels on the Y-axis from the first multi-angle frame. When the movement distance is greater than a third distance threshold but not greater than a fourth distance threshold, the client end 160 is changed to play the first video streaming outputted by the first signal source 115 on the main display area 410, that is, the client end 160 is changed to continuously obtain the image of the first to the 960-th pixels on the X-axis and the 541-th to 1080-th pixels on the Y axis from the first multi-angle frame, and so forth.

In the present invention, the array server 151 can combine the video streamings, outputted from the signal source, to form a multi-source streaming having a higher resolution and including all video streamings, and the streaming server 153 transmits the multi-source streaming to the client end 160, so that the client end 160 can switch the video streaming outputted from different signal source at local, thereby switching the video streamings under different view angles to play with almost no delay time.

In the first embodiment, when the client end 160 plays the first video streaming and the pause control signal is generated, the client end 160 pauses the first multi-angle frame obtained from the first multi-source streaming, and pauses obtaining the first single-angle frame from the first multi-angle frame, and continuously displays the last first single-angle frame obtained before the pause control signal is generated, so as to pause playing the first video streaming. After the pause control signal is generated, when the first switching control signal is generated, the client end 160 obtains another different first single-angle frame corresponding to the first switching signal from the multi-angle frame including the current displayed first single-angle frame, and displays the obtained another single-angle frame. For example, every time the first switching signal is generated, the client end 160 is changed to obtain and display the first single-angle frame from the block arranged at the front or back location, or the client end 160 can select to obtain and display the first single-angle frame from the block arranged at the front or back location by an interval, based on the movement direction and the movement distance indicated by the first switching signal.

The operations of the system and method of the present invention are described with reference to the second embodiment. Please refer to FIG. 6, which is a flowchart of a method for playing specific streaming selected from combined streamings of the present invention. As shown in FIG. 7, the first embodiment includes two sets of signal sources including the first signal sources 110 and the second signal sources 130; the first signal sources 110 and the second signal sources 130 are cameras mounted surround the performance stage, and each of the set of the first signal sources 110 and the set of the second signal sources 130 includes sixteen cameras, but the present disclosure is not limited thereto. The network addresses of the signal sources (111~126) is 172.0.0.1~172.0.0.16, the network addresses of the second signal sources (131~146) is 172.0.1.1~172.0.1.16, the signal sources (111~126) are annularly arranged in the network address sequence on the plane away from the performance stage by 150 cm, the second signal sources (131~146) are annularly arranged in the network address sequence on another plane above the performance stage by about 200 cm. The second signal source 131 having the network address of 172.0.1.1 corresponds to the first signal source 111 having the network address of 172.0.0.1, the second signal source 132 having the network address of 172.0.1.2 corresponds to the first signal source 112 having the network address of 172.0.0.2, and so forth.

After the first signal sources 110 and the second signal sources 130 are set up completely, the first signal sources 110 and the second signal sources 130 start to capture images on the performance stage, and transmit the captures image to the array server 151 through video streaming. In the first embodiment, in a condition that the resolution of each of the video streamings (the first video streamings and the second video streamings) generated by all signal sources including the first signal sources 110 and the second signal sources 130 is 960*540, and all signal sources transmit the video streamings to the array server 151 through NDI protocol.

After the array server 151 receives the first video streamings transmitted from the first signal sources 110 and the second video streamings transmitted from the second signal sources 130 (step 610), as described in the first embodiment, the array server 151 continuously obtains a first single-angle frame from each of the first video streamings, combines the obtained first single-angle frames to form a first multi-angle frame, and transmits the first multi-angle frame to the streaming server 153 in form of first multi-source streaming; in addition, similar to the process of generating the first multi-source streaming from the first video streamings, the array server 151 also continuously obtains a second single-angle frame from each of the second video streamings, combines the obtained second single-angle frames to form a second multi-angle frame, and transmit the generated second multi-angle frame to the streaming server 153 in the form of second multi-source streaming (step 630). In the first embodiment, detailed description for the process of generating the first multi-source streaming by the array server 151 is not repeated. In addition, the array server 151 also generates the second multi-angle frame including 4*4 blocks, each block has resolution of 960*540, defines the correspondence between the second single-angle frames and the blocks based on the network address (the source identification data) of the second signal sources (131~146), as shown in FIG. 2. In another embodiment, the array server 151 can define the correspondence between the second single-angle frames generated by the second signal sources 130 and the blocks based on the locations (in the first multi-angle frame) of the first single-angle frames generated by the first signal sources 110, which have the correspondence to the second signal sources 130. For example, in a condition that the array server 151 defines the blocks arranged in a sequential order from left to right and from top to bottom, the array server 151 can define the second single-angle frame of the second video streaming generated by the camera (that is, the second signal source 131) having the network address of 172.0.1.1 corresponds to the block 211, the second single-angle frame of the second video streaming generated by the camera (that is, the second signal source 132) having the network address of 172.0.1.2 corresponds to the block 212, the second single-angle frame of the second video streaming generated by the camera having the network address of 172.0.1.16 corresponds to the block 244. Next, the array server 151 arranges the first single-angle frames into the blocks, respectively, so that the array server 151 can generate a second multi-angle frame including sixteen second single-angle frames, generate the second multi-source streaming including the second multi-angle frames, and transmit the second multi-source streaming and the second multi-source streaming to the streaming server 153 by push-stream manner with instant message protocol.

After the streaming server 153 receives the first multi-source streaming and the second multi-source streaming transmitted from the array server 151, the client end 160 is connected to the streaming server 153 and requests the streaming server 153 to provide the first multi-source streaming. After the streaming server 153 receives the request from the client end 160, the streaming server 153 transmits the first multi-source streaming and the second multi-source streaming to the client end 160, so that the client end 160 receives the first multi-source streaming and the second multi-source streaming (step 650). In the first embodiment, the client end 160 can receive the first multi-source streaming and the second multi-source streaming by the pull-stream manner with HLS protocol.

After the client end 160 receives the first multi-source streaming and the second multi-source streaming, the client end 160 continuously obtains the first multi-angle frame from the received first multi-source streaming, continuously obtains the first single-angle frame from the first multi-angle frame, and continuously display the obtained first single-angle frame, so as to play the first video streaming (step 660). In the first embodiment, the preset value indicates to obtain the single-angle frame of the block arranged at the first location, the client end 160 starts calculation from the upper left corner to obtain the image of the first to 960-th pixels on the X-axis and the first to 540-th pixels on the Y-axis from the each of the first multi-angle frames, use the obtained image as the first single-angle frame, and display the obtained image (that is, the first single-angle frame). Therefore, the first video streaming generated by the first signal source 111 can be played on the client end 160.

When the client end 160 is playing the first video streaming and the first switching signal is generated, similar to the first embodiment, the client end 160 continuously obtains the first multi-angle frame from the received first multi-source streaming, continuously obtains the another different first single-angle frame corresponding to the first switching signal from each first multi-angle frame, and continuously display the obtained first single-angle frames to play the first video streaming; and when the second switching signal is generated, the client end 160 is changed to obtain the second multi-angle frame from the second multi-source streaming corresponding to the second switching signal, continuously obtain the second single-angle frame corresponding to the current-displayed first single-angle frame from each second multi-angle frame, and continuously display the obtained second single-angle frames to play the second video streaming (step 680). In the first embodiment, when the second switching signal is the touch control signal generated by user's finger upwardly sliding on the main display area 410 of the touch screen 400 of the client end 160 (as shown in FIG. 4). In a condition that the touch control signal indicating sliding up and down on the main display area 410 can change the view angle of the currently-played video streaming, after the second switching signal is generated, the client end 160 selects and outputs the second video streaming from the second signal source 131 corresponding to the first signal source 111 of the currently-played first video streaming, based on the touch control signal (that is, the second switching signal) of upward sliding, that is, the client end 160 starts calculation on the upper left corner of each second single-angle frame to obtain the image of the first to 960-th pixels on the X-axis and the first to 540-th pixels on the Y axis, uses the obtained image as the second single-angle frame generated by the second signal source 131, and displays the obtained second single-angle frame. As a result, the second video streaming shot and outputted by the second signal source 131 can be played on the client end 160.

Similarly, while the client end 160 is playing the second video streaming generated by the shooting operation of the second signal source 131, when the touch control signal (that is, the second switching signal) indicating downward sliding operation is generated, the client end 160 is changed to continuously obtain the first multi-angle frame from the first multi-source streaming corresponding to the second switching signal, and continuously obtain the first single-angle frame outputted from the first signal source 111 corresponding to the second signal source 131 of the currently-played second single-angle frame from each first multi-angle frame; that is, the client end 160 obtains the image of the first to 960-th pixels on the X-axis and the first to 540-th pixels on the Y-axis in each first multi-angle frame, and continuously displays the obtained images to play the first video streaming generated by shooting operation of the first signal source 111. When the generated touch control signal is the first switching signal, not the second switching signal, the client end 160 continuously obtains the second multi-angle frame from the received second multi-source streaming, continuously obtain the second single-angle frame generated by the second signal source 132 corresponding to the first switching signal from each second multi-angle frame; that is, the client end 160 obtains the image of the 961-th to the 1920-th pixels on the X-axis and the first to the 540-th pixels on the Y-axis from the first multi-angle frame, and continuously displays the obtained images to play the second video streaming generated by shooting operation of the second signal source 132. It should be noted that the first switching signal is not limited to correspond to the second signal source 132, the client end 160 can correspond to one of the second signal sources (133~146) other than the second signal source 131 according to the movement direction and the movement distance indicated by the first switching signal, and continuously obtain and display the image, corresponding to certain location, from the second multi-angle frame.

According to above-mentioned contents, the difference between the present invention and the conventional technology is that, in the present invention, the array server combines the video streamings outputted from the signal sources, to form the multi-source streaming including all video streamings, and transmits the combined multi-source streaming to the streaming server, the streaming server provides the multi-source streaming to the client end, the client end obtains the video streaming to be played from the received multi-source streaming. Therefore, the solution of the present invention is able to solve the conventional technology problem that a user needs to wait a reaction time for switching view angle requires when watching live broadcast, thereby achieving the technical effect of reducing the streaming load of the server during live broadcast.

Furthermore, the method for playing specific streaming selected from combined streamings of the present invention can be implemented by hardware, software or a combination thereof, and can be implemented in a computer system by a centralization manner, or by a distribution manner of different components distributed in several interconnect computer systems.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A method for playing specific streaming selected from combined streamings, comprising:
   receiving, by an array server, a plurality of first video streamings outputted by first signal sources;
   receiving, by the array server, a plurality of second video streamings outputted by second signal sources, the second signal sources corresponding to the first signal sources;

generating a first multi-source streaming comprising first multi-angle frames, and transmitting the first multi-source streaming to a streaming server, by the array server, wherein the array server obtains a first single-angle frame from each of the first video streamings, generates the first multi-angle frames each comprising a first array of M*N blocks, and defines correspondences between the M*N blocks and the first single-angle frames and locates the first single-angle frames into the first array of M*N blocks based on first source identification data of the first signal sources to combine the first single-angle frames to form each first multi-angle frame, wherein at least one of M and N is greater than one;

generating a second multi-source streaming comprising second multi-angle frames, and transmitting the second multi-source streaming to the streaming server, by the array server, wherein the array server obtains a second single-angle frame from each of the second video streamings, generates the second multi-angle frames each comprising a second array of M*N blocks, and defines respective correspondences between the second array of blocks and the second single-angle frames and locates the second single-angle frames into respective blocks in the second array of blocks based on second source identification data of the second signal sources so as to have one-to-one correspondence with a respective block in the first array of M*N blocks, to combine the second single-angle frames to form each second multi-angle frame;

connecting a client end to the streaming server, and receiving the first multi-source streaming and the second multi-source streaming by the client end;

repeatedly obtaining first single-angle frames generated by the same one of the first signal sources from the first multi-angle frames, and displaying the obtained first single-angle frames while the first video streaming is played, by the client end;

when a first switching signal is generated, changing to repeatedly obtain first single-angle frames generated by another of the first single-angle frames, the another of the first single-angle frames corresponding to the first switching signal and the correspondences between the M*N blocks and the first single-angle frames, of the first signal sources, from the first multi-angle frames, and displaying the obtained another first single-angle frames so that another first video streaming is played, by the client end; and when a second switching signal is generated when repeatedly displaying currently-displayed first single-angle frames in the first multi-source streaming, changing to repeatedly obtain second single-angle frames from one of the second signal sources in the second multi-source streaming, the second single-angle frames corresponding to the currently-displayed first single-angle frames, the second multi-angle frames comprised in the second multi-source streaming corresponding to the second switching signal, and repeatedly displaying the obtained second single-angle frames.

2. The method for playing specific streaming selected from combined streamings according to claim 1, after the step of the first video streaming is played, further comprising:

after a pause control signal is generated and when the first switching signal is generated, obtaining another first single-angle frame corresponding to the first switching signal from the multi-angle frame comprising the currently-displayed first single-angle frame, so as to display the obtained another first single-angle frame, by the client end.

3. The method for playing specific streaming selected from combined streamings according to claim 1, wherein the first switching signal is a touch control signal generated by sliding a movement distance toward a movement direction on the client end; and the step of changing to continuously obtain another first single-angle frame generated by another, corresponding to the first switching signal, of the first signal sources from the multi-angle frames, by the client end, comprises obtaining, by the client end, another first single-angle frame outputted by another, which is arranged in a direction corresponding to the movement direction and arranged in an interval corresponding to the movement distance with the first signal source outputting the currently-display first single-angle frame, of the first signal sources.

4. The method for playing specific streaming selected from combined streamings according to claim 1, further comprising:

setting a distance threshold, by the client end;

when a movement distance indicated by the second switching signal does not exceed the distance threshold, determining the second switching signal corresponds to a second signal source closer to the first signal source, by the client end; and when the movement distance exceeds the distance threshold, determining the second switching signal corresponds to a second signal source that is more distant from the first signal source, by the client end.

5. The method for playing specific streaming selected from combined streamings according to claim 1, further comprising:

during the process of the first switching signal being generated, changing, by the client end, the movement direction and the movement distance with the operation of the client for changing an interval position and the another first single-angle frame with the movement direction and the movement distance.

6. The method for playing specific streaming selected from combined streamings according to claim 1, wherein the first switching signal is a rotating signal generated by rotating the client end in the movement direction or by an angle.

7. The method for playing specific streaming selected from combined streamings according to claim 1, wherein the step of connecting the client end to the streaming server and receiving the first multi-source streaming by the client end comprises:

after the streaming server receives the first multi-source streaming, connecting to the streaming server, by the client end;

requesting, by the client end, the streaming server to the first multi-source streaming; and transmitting the first multi-source streaming from the streaming server to the client end.

8. The method for playing specific streaming selected from combined streamings according to claim 1, further comprising:

when a resolution of one of the first single-angle frames is different from a resolution of the corresponding block of the multi-angle frame in the first array, adjusting resolution of the one of the first single-angle frames to equal the resolution of the corresponding block in the first array, by the array server.

9. A system for playing specific streaming selected from combined streamings, comprising,
- a plurality of first signal sources, wherein each of the first signal sources is configured to output a first video streaming;
- a plurality of second signal sources, wherein each of the second signal sources is configured to output a second video streaming, the second signal sources corresponding to the first signal sources;
- a streaming server;
- an array server configured to receive the first video streaming, generate a first multisource streaming comprising first multi-angle frames, generate a second multisource streaming comprising second multi-angle frames, and transmit the first multi-source streaming to the streaming server, wherein the array server:
  - obtains a first single-angle frame from each of the first video streamings, generates the first multi-angle frames each comprising a first array of M*N blocks, and defines correspondences between the M*N blocks and the first single-angle frames and locates the first array of single-angle frames into the M*N blocks based on first source identification data of the first signal sources to combine the first single-angle frames to form each first multi-angle frame, wherein at least one of M and N is greater than one; and
  - obtains a second single-angle frame from each of the second video streamings, generates the second multi-angle frames each comprising a second array of of M*N blocks, and defines respective correspondences between the second array of blocks and the second single-angle frames and locates the second single-angle frames into respective blocks in the second array of blocks based on second source identification data of the second signal sources so as to have one-to-one correspondence with a respective block in the first array of M*N blocks, to combine the second single-angle frames to form each second multi-angle frame;
- a client end connected to the streaming server, and configured to receive the first multisource streaming and the second multi-source streaming, and repeatedly obtain the first single-angle frame generated by the same one of the first signal source from the first multi-angle frames, and display the obtained first single-angle frames, so as to play the first video streaming corresponding to the obtained first single-angle frame,
- wherein when a first switching signal is generated, the client end is changed to repeatedly obtain first single-angle frames generated by another of the first single-angle frames corresponding to the first switching signal and the correspondences between the M*N blocks and the first single-angle frames, of the first signal sources, from the first multi-angle frames, and display the obtained another first single-angle frames, so as to play another first video streaming; and
- when a second switching signal is generated when the client end is repeatedly displaying currently-displayed first single-angle frames in the first multi-source streaming, the client end is changed to repeatedly obtain second single-angle frames from one of the second signal sources in the second multi-source streaming, the second single-angle frames corresponding to the currently-displayed first single-angle frames, the second multi-angle frames comprised in the second multi-source streaming corresponding to the second switching signal, and the client end repeatedly displays the obtained second single-angle frames.

10. The system according to claim 9, wherein after a pause control signal is generated and when the first switching signal is generated, the client end obtains another first single-angle frame corresponding to the first switching signal, from the multi-angle frames comprising the currently-displayed first single-angle frame, and displays the obtained another first single-angle frame.

11. The system according to claim 9, wherein when a touch control signal indicating an operation of sliding a movement distance toward a movement direction is generated, the client end determines that the first switching signal is generated, and then obtains another first single-angle frame outputted from another of the first signal sources located from the first signal source, generating the currently-displayed first single-angle frame, by an interval corresponding to the movement distance in a direction corresponding to the movement direction.

12. The system according to claim 9, wherein the client end sets a distance threshold, and determines that the second switching signal corresponds to a second signal source closer to the first signal source when a movement distance indicated by the second switching signal does not exceed the distance threshold, and determines that the second switching signal corresponds to a second signal source more distant from the first signal source when the movement distance exceeds the distance threshold.

13. The system according to claim 9, wherein the client end changes a movement direction and a movement distance with the operation of the client for changing an interval position and the another first single-angle frame with the movement direction and the movement distance during the process of the first switching signal being generated.

14. The system according to claim 9, wherein when a rotating signal indicating an operation of rotating the client end in the movement direction or by an angle is generated, the client end determines that the first switching signal is generated.

15. The system according to claim 9, wherein the first source identification data are network addresses of the first signal sources, numbers assigned to interfaces connected to the first signal sources, product serial numbers of the first signal sources, or specific data preset in the first signal sources.

16. The system according to claim 9, wherein the array server adjusts a resolution of at least one of the first single-angle frames for making a resolution of the first single-angle frames the same as resolution of the corresponding blocks in the first arrays of the multi-angle frames.

* * * * *